J. M. WORTH.
CHANGE SPEED TRANSMISSION GEAR.
APPLICATION FILED JUNE 28, 1907.
945,070.
Patented Jan. 4, 1910.
3 SHEETS—SHEET 1.
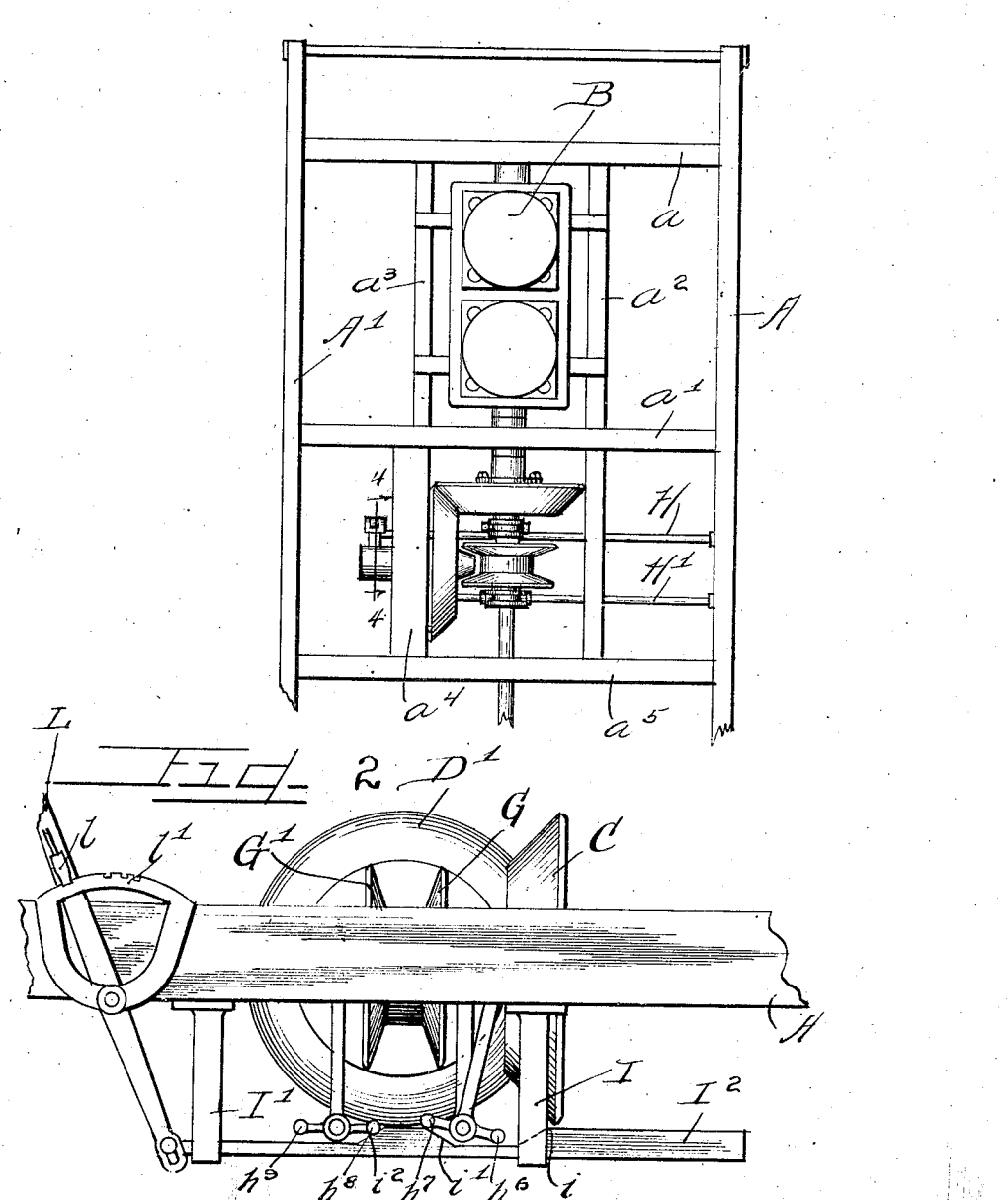

J. M. WORTH.
CHANGE SPEED TRANSMISSION GEAR.
APPLICATION FILED JUNE 28, 1907.
945,070.
Patented Jan. 4, 1910.
3 SHEETS—SHEET 2.
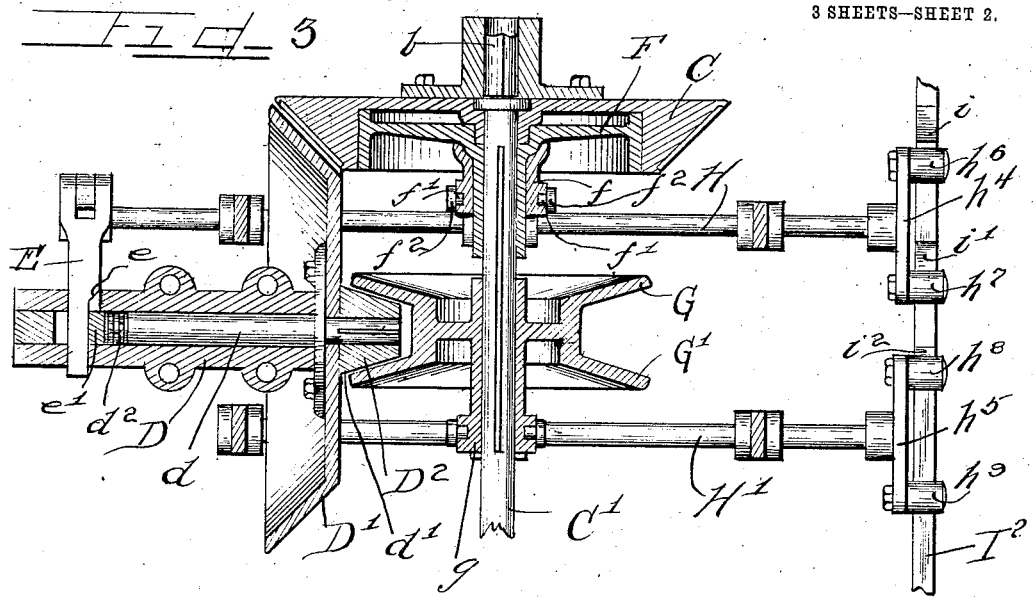
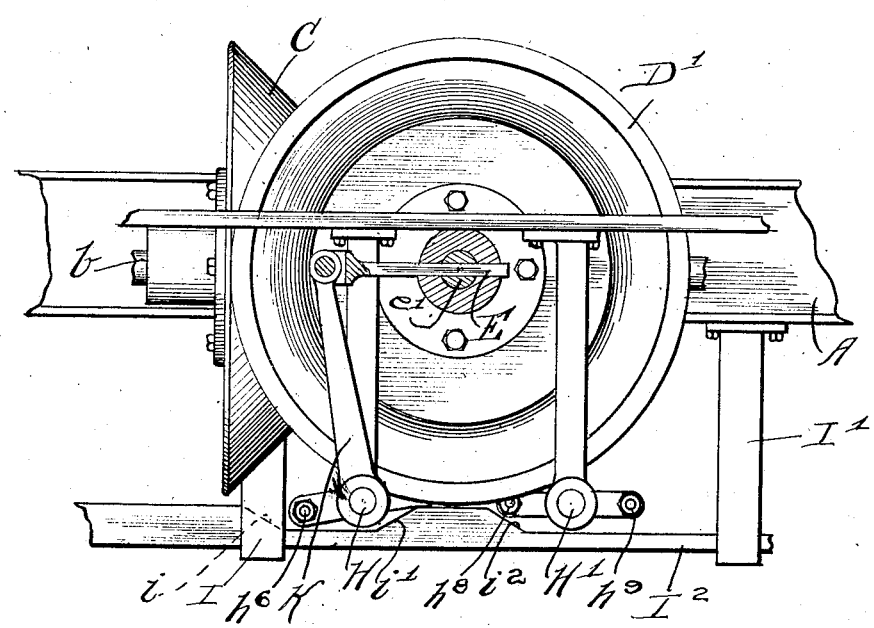

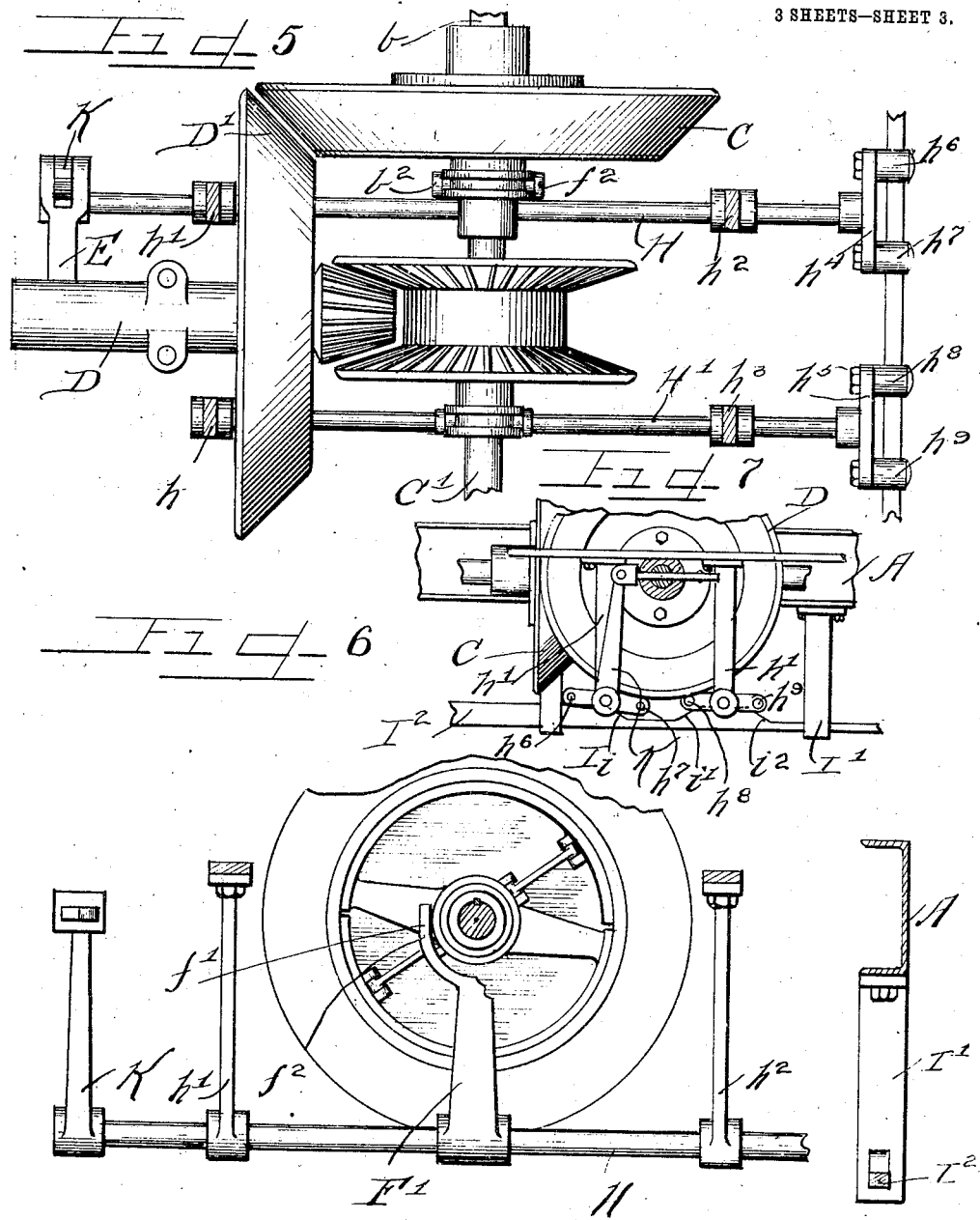

UNITED STATES PATENT OFFICE.

JAMES M. WORTH, OF EVANSVILLE, INDIANA.

CHANGE-SPEED TRANSMISSION-GEAR.

945,070.

Specification of Letters Patent. Patented Jan. 4, 1910.

Application filed June 28, 1907. Serial No. 381,355.

*To all whom it may concern:*

Be it known that I, JAMES M. WORTH, a citizen of the United States, and a resident of the city of Evansville, in the county of Vanderburg and State of Indiana, have invented certain new and useful Improvements in Change-Speed Transmission-Gears; and I do hereby declare that the following is a full, clear, and exact description of the same, reference being had to the accompanying drawings, and to the letters of reference marked thereon, which form a part of this specification.

This invention relates to improvements in transmission gears and more particularly to a transmission gear adapted among other purposes for use in transmitting the drive of the motor, in vehicle propulsion. In devices for this purpose many different types of gears have been employed, some of which are complicated and of numerous parts requiring frequent and exact adjustment, lacking which they fail for the purpose for which installed.

The object of this invention is to provide a transmission gear adapted to provide a high and a low speed drive ahead and a reverse, and in which when the vehicle has attained sufficient momentum on the low speed drive the transmission shaft is coupled direct with the engine or drive shaft, thus utilizing the direct drive of the engine for high speed.

It is a further object of the invention to provide a transmission of the class described adapted to exert great power in starting or reversing and in which the respective frictional elements are adapted to operate as a brake when desired to check the movement of the vehicle in either direction.

Finally it is an object of my invention to provide a cheap and simple mechanism of the class described adapted for general use for vehicle propulsion, and for many other purposes, and of such strong and durable construction as to practically eliminate transmission troubles, and, also to provide mechanism for operating the transmission whereby ease and quickness of control is assured.

The invention consists in the matters hereinafter described and more fully pointed out and defined in the appended claims.

In the drawings: Figure 1 is a fragmentary top plan view of a chasis provided with a frictional transmission device embodying my invention. Fig. 2 is an enlarged side elevation thereof. Fig. 3 is an enlarged horizontal section taken centrally of the transmission. Fig. 4 is an enlarged section taken on line 4—4 of Fig. 1. Fig. 5 is a top plan view showing toothed gears employed in part. Fig. 6 is an enlarged fragmentary transverse section and detail, illustrating the construction operation of the clutch. Fig. 7 is a fragmentary detail illustrating the position of the shifting bar when at reverse.

In said drawings: A and A' indicate the side sills or frame members of a chasis provided as shown, with transverse sills $a$—$a'$, as is usual, between which and extending longitudinally of the chasis are parallel center sills $a^2$ and $a^3$. Supported upon said center sills $a^2$ and $a^3$ is the motor indicated as a whole by B, and which may be of any suitable kind or construction but which in the drawings is shown as an internal combustion engine. Leading rearwardly from the crank case is the engine shaft $b$, as shown in Fig. 3 on which is rigidly secured a beveled friction member C, of relatively large size the smaller face of which is directed rearwardly and which is the balance wheel of the engine. Journaled rotatively at the axis of said friction member C, is the driven shaft C' which leads to any suitable differential on the rear axle (not shown) if employed in a shaft drive vehicle as shown, in the present instance, and which, of course, may be provided with any suitable universal joint at any suitable point or points. The rear end $a^4$ of the center sill $a^3$ is wider than the center sill $a^2$ and is supported on the sill or beam $a^5$. Rigidly secured beneath said sill $a^4$ at the rear of the driving friction member C is a sleeve D, in which is journaled a shaft $d$, extending transversely of the vehicle and provided on its inner end at the inner side of said beam $a^4$, with a conical friction member D', corresponding with and approximately the same size as the friction member C, and adapted to coact therewith, and adapted to slide into or out of engagement therewith by longitudinal movement of its shaft in said bearing sleeve D. The shaft $d$ is reduced in diameter at its inner end, passing through the hub of said friction member D' and rigidly secured on its extremity which projects therethrough is a conical friction member D² of smaller size, which projects axially therefrom. Said shaft $d$ is provided at its outer end with a ball or any suitable anti-friction bearing, indicated as a whole by $d^2$, which may be of any desired type or character.

The sleeve or housing D is provided with a transverse aperture therethrough, through which extends a sliding wedge bar E which at its inner end is relatively narrow and is provided on its outer end with an incline $e$. As shown, a bearing block $e'$ is interposed between the ball bearing $d^2$ and said wedge bar so that when said bar is forced inwardly the incline thereon forces the shaft $d$ inwardly transversely the frame bringing the friction face thereon with the driven friction member D' into positive engagement with the driving friction member C, as shown in Fig. 1, while retraction of said bar permits said friction member to disengage the driving friction member as shown in Figs. 3 or 5. Feathered on the shaft C' is an expansion or other suitable clutch F adapted to fit in a suitable recess in the rear face of the driving friction member C to couple the driven shaft direct with the drive shaft. Secured on the hub of said clutch is a sleeve $f$, provided with a peripheral groove in which engage suitable trunnions $f'$ on the upwardly directed yoke arms $f^2$, secured on a shifting arm F'.

Feathered to slide on the shaft C' and integral with a sleeve $g$ and each other, as shown, are double inwardly facing conical friction gears comprising a front rearwardly facing friction member G, and a forwardly facing friction member G' between which the conical friction member D², projects in position to be engaged by either. Journaled in suitable standards $h$—$h'$—$h^2$ and $h^3$, rigidly secured on and depending below the center sills $a^2$ and $a^4$ are transverse rock shafts H and H'. Secured on one end of each adjacent the side frame member A, is a transverse bar $h^4$ and $h^5$ respectively, each of which is provided on its extremities with an outwardly directed stud, provided with a roller and indicated on the shaft H by $h^6$ and $h^7$ and on the shaft H' by $h^8$ and $h^9$. Slidable in suitable standards I and I' secured on the under side of the sill A is a shifting bar I² provided with inclined faces $i$—$i'$ and $i^2$, adapted to engage the rollers $h^6$—$h^7$—$h^8$ and $h^9$ respectively. The shifting arm F' for the clutch is rigidly secured at its lower end on the shaft H, as shown in Fig. 6, as is also a lever K, as shown in Fig. 4 and to the upper end of which the wedge bar E is pivotally engaged.

As shown a shifting lever L adapted to be manually actuated is pivotally engaged on the frame member A, and provided with a suitable detent $l$ and a segment $l'$ to hold the same in adjusted position, and at its lower end pivotally engages the shifting bar I², at one end thereof, as shown in Fig. 2, to slide said bar longitudinally of the chasis thereby partly rotating the rock shafts H and H'.

The operation is as follows: The hand lever L is shifted forwardly in starting; this holds the clutch out of engagement by the roller $h^6$, engaging on the incline or angular face $i$, and at the same time forces the slide bar E, inwardly thereby pushing outwardly the shaft $d$, with its friction member D' bringing said friction member into engagement on the driving friction member C. At the same time, the roller $h^8$ engages on the incline $i^2$, thereby drawing the double friction member G—G' longitudinally of the driven shaft and bringing the friction face G into driving engagement with the conical friction member D². Inasmuch as the drive is from the small to a larger friction member a low speed is afforded which insures an easy start for the machine. Having gained the desired initial speed, the hand lever L is shifted rearwardly to the position shown in Figs. 2 and 4. When this occurs, the roller $h^7$ engages on the incline $i'$ of the shifting bar I² throwing the clutch into engagement and at the same time retracting the lever K to withdraw the wedge bar E as shown in Figs. 3 and 4, thus permitting the friction member D' to retract from the driving friction member. This movement releases the pressure exerted by the shaft H', on the transmitting friction member G, retracting the same to neutral position as shown in Fig. 3. When so adjusted the drive is direct from the engine shaft and in consequence all frictional elements are out of engagement excepting the clutch. In reversing the lever L is thrown forwardly, shifting the bar I² so that the roller $h^8$ engages on the incline $i'$, the roller $h^9$ engages on the incline $i^2$, and the roller $h^6$ engages on the incline $i$ as shown in Fig. 7. This is neutral position as shown in plan view in Fig. 1. Shifting the lever forwardly now brings the friction member G' into engagement with the friction member D², reversing the drive and a shift of the lever forces the friction members to normal, then forward adjustment of the lever gives slow speed ahead as before described. When thus adjusted the shift from forward to reverse is instantaneous permitting great facility of operation in close quarters. Of course, tooth gears may be used if desired for either the driving and the driven friction members or for the reducing and the transmitting friction members or all the friction members and obviously many details of construction may be varied without departing from the principles of this invention.

I claim as my invention:

1. In a transmission device the combination with a driving shaft, of a friction member thereon, a driven shaft, a clutch thereon adapted to engage the friction member, a driven friction member adapted to contact the driving friction member, means for simultaneously shifting said friction members into contacting engagement and shifting the clutch out of operative relation and connected friction members adapted to be driven from said driven friction member.

2. In a transmission device the combination with a driving shaft, of a friction member thereon, a driven shaft, a clutch thereon adapted to engage the friction member, a driven friction member adapted to contact the aforesaid friction member, means for simultaneously shifting said friction members into contacting engagement and shifting the clutch out of operative relation, inwardly facing friction members on the driven shaft, a friction member shifted simultaneously as the driven friction member is shifted and extending between the facing friction members, and means for shifting the inwardly facing friction members one to contact said friction member extending between them for speed ahead.

3. In a device of the class described a driving shaft, a driving friction member thereon, a driven shaft, a clutch thereon, inwardly facing friction members on the driven shaft, a shaft extending transversely of the aforesaid shafts, a plurality of friction members thereon and mechanism adapted to shift said friction members into operative relation and the clutch out of operative relation for slow speed ahead and to shift the clutch into operative relation and return the friction members to normal for different rates of speed ahead.

4. In a device of the class described a driving shaft, a driving friction member thereon, a driven shaft, a clutch thereon, inwardly facing friction members on said driven shaft, a shaft extending transversely of the aforesaid shafts, a plurality of friction members thereon, mechanism adapted to shift said friction members into operative relation and the clutch out of operative relation for slow speed ahead and to shift the clutch into operative relation and return the friction members for a different rate of speed ahead, said shifting mechanism adapted also to shift said friction members and clutch for reverse speed.

5. In a device of the class described the combination with a driving shaft of a driven shaft in axial alinement therewith, a friction member on the driving shaft, a clutch on the driven shaft adapted to frictionally engage the same, inwardly facing rigidly connected friction members on the driven shaft, a shaft extending at an angle with the aforesaid shafts, friction members thereon, one adapted to contact the appropriate friction member of the connected friction members and mechanism adapted for appropriately shifting the friction members and clutch for different rates of speed ahead and for reverse speed.

6. In a device of the class described the combination with a driving friction member, a driven shaft, rigidly connected friction members thereon, friction members adapted to contact the driving and driven friction members simultaneously for speed in one direction and a clutch on the driven shaft adapted for frictional engagement with one of the friction members for speed in the same direction.

7. In a device of the class described the combination with a driving friction member, a driven shaft, rigidly connected friction members thereon, friction members adapted to contact the driving and driven friction members simultaneously for speed in one direction, a clutch on the driven shaft adapted for frictional engagement with one of the friction members for speed in the same direction, and mechanism for shifting the friction members into engagement for reverse speed when the clutch is out of operative position.

8. In a device of the class described the combination with a driven shaft of a driving friction member, driven friction members having their axis in alinement therewith, friction members adapted to operatively connect the aforesaid driving and driven friction members and a clutch connecting the driving friction member and the driven shaft for speed in one direction.

9. In a device of the class described a driving member, a driven shaft, rigidly connected driven members thereon, a plurality of transmission members one adapted to engage the driving member, and the other either of the driven members and mechanism for simultaneously shifting the transmission members into engagement with the driving and driven members.

10. In a device of the class described the combination with a driving member of a driven shaft, rigidly connected driven members thereon, a plurality of transmission members one adapted to engage the driving member, and the other either of the driven members, mechanism for simultaneously shifting the transmission members into engagement with the driving and driven members, and a clutch secured to the driven shaft adapted to engage the driving member for speed in one direction.

11. In a device of the class described the combination with the engine shaft, of a member rotatable therewith, an axially alined driven shaft, friction members movable thereon one of which is adapted to frictionally engage the rotatable member on the engine shaft for engine shaft speed, and friction members adapted to afford frictional engagement between said member rotated by the engine shaft and the other friction members on the driven shaft for speed in either direction.

12. In a device of the class described the combination with a driving friction member, of simultaneously rotatable friction members of different sizes journaled transversely thereof, the larger of which is adapted to contact the driving friction member and driven friction members, one adapted to engage the driving friction member when said larger friction member is not in engagement with the driving friction member and the others adapted to frictionally engage the smaller of the transversely journaled friction members when said larger friction member is engaging the driving friction member.

13. In a device of the class described the combination with a driven shaft of a plurality of friction elements thereon, a driving element adapted to engage one of the elements on the driven shaft and means adapted to operatively connect any of the remaining elements on the driven shaft with the driving element.

14. In a transmission mechanism the combination with a driving friction member, of a shaft journaled transversely thereof, a friction member thereon adapted to contact the driving friction member, a plurality of driven friction members, one of which is adapted to be directly coupled with the driving friction member and a friction member on the transverse shaft adapted to engage any of the other driven friction members.

15. In a device of the class described the combination with the engine shaft of a friction member secured thereon, a driven shaft in axial alinement therewith, a plurality of driven friction members splined thereon, a shaft journaled transversely of the driven shaft, a large friction member thereon adapted to frictionally engage the driving friction member, a small friction member thereon adapted simultaneously to engage one of the driven friction members, and a clutch slidable on the driven shaft adapted to engage the driving friction member.

16. In a device of the class described the combination with a driving friction member, a driven shaft, a clutch slidable on the driven shaft adapted to engage the driving friction member, a plurality of friction members slidable on said shaft, friction members having their axis transversely of the axis of the driven friction members adapted one to engage one of the slidable friction members, a shifting bar and mechanism operated by movement of said bar to simultaneously shift the clutch and the adjustable friction members into and out of operative relation.

17. In a device of the class described the combination with a driving member, a driven shaft, a clutch adjustable thereon, driven friction members adjustable on said shaft, friction members adjustable transversely thereof, adapted to operatively connect the driving member and driven friction members, a shifting bar having inclines or angular faces and mechanism operated by movement thereof to simultaneously actuate all of the adjustable friction members into operative position and the clutch out of operative position and to release said adjustable friction members and adjust the clutch into operative position.

18. In a device of the class described the combination with a driving friction member of a driven shaft, a clutch thereon, rigidly connected inwardly facing friction members on said shaft, a friction member adapted to contact the driving friction member, a friction member rotatable therewith to engage one of the rigidly connected friction members, shafts journaled below the clutch and connected friction members, means affording a pivotal connection between one of said shafts and the clutch and between the other shaft and the rigidly connected friction members, operative connections between one of said shafts and the friction member capable of contacting the driving friction member and means adjusting the shafts to move said friction members into operative relation and to move the clutch correspondingly.

19. In a device of the class described a driven shaft a driving friction member, a clutch on the driven shaft adapted to engage the same, driven friction members, friction members adapted to afford operative connections between the driving and the driven friction members, shafts connected with the driven friction members and with the clutch and mechanism for rocking said shafts for adjusting the friction members into operative position and to actuate the clutch.

20. In a device of the class described a driving friction member having a recess therein, a driven shaft, a clutch thereon adapted to fit in said recess, driven friction members on said driven shaft, a slotted sleeve or housing extending transversely of the driven shaft, a shaft therein, friction members thereon adapted to afford connections between the driving and driven friction members, shafts journaled below the driven shaft, means operatively connecting one of the same with the driven friction members, means operatively connecting one of said shafts and the clutch, a block extending through the slot in the housing or sleeve for shifting the shaft in the housing, rollers secured on each shaft and means adapted to contact said rollers thereby adjusting the friction members and clutch into and out of operative relation.

21. In a transmission mechanism a driving member, adjustable driven members and simultaneously adjustable transmission members, one adapted to contact the driving member and the other the appropriate driven member.

22. In a transmission mechanism a driving member, different sized transmission members connected to move together and one adapted to contact the driving member and connected adjustable driven members either one adapted to engage one of said transmission members.

23. In a transmission device a driving shaft, a driving friction member having a peripheral friction face and an internal friction face, a clutch adapted to frictionally engage the internal friction face for shaft speed, simultaneously adjustable friction members of different diameters, one of which is adapted to contact said peripheral friction face of the driving member, and oppositely facing friction members either of which is adapted for adjustment to contact one of the simultaneously adjustable friction members.

24. In a transmission mechanism the combination with alined driving and connected driven friction members and friction members of different diameters adapted to operatively connect said driving and driven friction members for speed ahead or reverse.

25. In a transmission mechanism the combination with a combined balance wheel and driving friction member and alined driven friction members of rigidly connected friction members of different diameters adapted to operatively connect said driving and driven friction members for speed ahead or reverse, a driven shaft, a clutch connected thereto adapted to be actuated by the driving friction member and means adapted to shift the driven friction member and the friction members of different diameters transversely of each other.

26. In a device for the purposes specified a driven shaft, a plurality of driven members thereon, a driving member, connected members adapted to transmit motion from the driving to the driven members and a clutch on the driven shaft adapted to engage the driving member.

27. In a transmission mechanism transmission members simultaneously adjustable, a driving member adapted to engage one of the members whereby the other transmission member is actuated, inwardly facing members both adapted to independently engage the other of said simultaneously adjustable transmission members for speed ahead or reverse and means for adjusting the inwardly facing members.

28. In a device of the class described adjustably connected, inwardly facing driven members, a transmission member extending therebetween, a transmission member operatively connected with said transmission member, a driving friction member adapted to contact the last named transmission member, a driven shaft and a clutch rigidly secured thereon adapted to be driven directly from the driving friction member.

29. In a device of the class described a driving member, inwardly facing driven members, transmission members adapted to afford connections between the driving and driven members, shafts below all of said members, operative connections between said shafts and the respective members and means adapted to rock the shafts in effecting the adjustments.

30. In a device of the class described the combination with a driving member, a shaft, driven members thereon, a shaft journaled transversely of the aforesaid shaft, members thereon adapted to transmit motion from the driving to the driven members and mechanism for shifting the driven members on their shaft and reciprocating the transverse shaft in effecting the adjustments.

31. In a transmission device a driving member, connected driven members one for speed ahead and one for reverse, members adapted to connect said driving and driven members, a clutch adapted to engage the driving member, a plurality of shafts, means connecting one of the same with the connected driven members, means connecting the other of said shafts with the clutch, means for actuating both of said shafts and means adapted to operate the members for connecting the driving and driven members.

32. In a device of the class described a driving shaft, a driving member driven thereby, a driven shaft, driven members thereon, a shaft extending transversely thereof, members thereon for engaging the driving and driven members, a clutch secured to the driven shaft adapted for adjustment to engage the driving member on the driving shaft, a bar having angular or inclined faces and mechanism actuated by the inclined faces for effecting the adjustment of the various members.

33. In a device of the class described the combination with a driven shaft of a driving member, a clutch on the driven shaft adapted for engagement with the driving member, a shaft extending transversely thereof, a slotted sleeve or housing in which the shaft is journaled, members on said shaft one adapted to engage the driving member, driven members adapted to contact the other of said members, a plurality of shafts, independent connections between the appropriate shaft to operate the driven members and clutch, a pair of antifriction rollers on each shaft, a bar provided with angular faces upon which the antifriction rollers engage in operating the shafts, and a wedge bar operated by one of the shafts and extending through the slot in the sleeve for actuating the transverse shaft.

34. A transmission device comprising rotatable driven members, a driving member, a plurality of members all on the same side of said driving and driven members and adapted to afford driving connections therebetween.

35. A transmission device comprising a driven shaft, rotatable driven members driven thereby, a driving member, a plurality of members all on the same side of said driving and driven members adapted to afford driving connections therebetween, rock shafts adapted to adjust the members and a clutch secured in the driven shaft also operated by one of said rock shafts to engage the driving member.

36. In a transmission device the combination with members for transmitting power of an adjusting bar having angular or inclined faces, rock shafts, bars secured to the corresponding ends of each, anti-friction rollers on each bar adapted to contact the angular faces of the adjusting bar, transmission members, operative connections between the same and the shafts adapted by adjustment of said adjusting bar to effect the various adjustments of the transmission members, and a clutch adapted for adjustment by said adjusting bar for speed in one direction.

37. In a device of the class described the combination with a driving member and connected, simultaneously movable driven members operated thereby, an adjusting bar having cam faces, shafts journaled below the driving and driven members, transverse bars rigidly secured thereto, friction rollers on said bars adapted to contact the cam faces and mechanism operated by movement of the shafts for adjusting the members for various speeds ahead and reverse.

38. In a device of the class described a driven shaft, inwardly facing driven members thereon, a driving member embracing a combined balance wheel, friction face and clutch, transmission members, one adapted to engage the friction face of the driving member and the other transmission member adapted to be engaged by one of the inwardly facing driven members, and a clutch on the driven shaft adapted to engage the aforesaid clutch.

39. In a transmission mechanism a driving shaft, a combined balance wheel, driving friction member and driving clutch thereon, transmission members, one adapted to engage the driving friction member, a driven shaft, driven members thereon adapted to engage the other of the transmission members and a clutch on the driven shaft adapted to engage the clutch on the driving shaft.

40. In a device of the class described a double driving friction member having beveled faces, a transmission member adapted for contacting engagement with said faces, means for driving the transmission member, a driven shaft and a clutch secured thereto for high speed ahead.

41. In a device of the class described a driven shaft, a member slidable thereon having friction faces, a friction member extending transversely of the aforesaid member adapted to contact any of said friction faces, mechanism for simultaneously shifting the transverse friction member and the slidable member for the transverse friction member to engage the appropriate friction face of the slidable member and a clutch on the driven shaft adapted to be operatively connected with the drive shaft for driving the driven shaft at high speed.

42. In a device of the class described a driven shaft, friction members slidable thereon, a reciprocating transmission shaft, friction members thereon and adjustable therewith, a driving friction member and a sliding block having a cam for engaging one end of the transmission shaft and adjusting the same longitudinally.

43. In a device of the class described a driven shaft, friction members slidable thereon, an adjustable transmission shaft, friction members thereon and adjustable therewith, a sliding block for adjusting the transmission shaft, a driving friction member and a clutch on the driven shaft adapted to engage the driving friction member.

In testimony whereof I have hereunto subscribed my name in the presence of two subscribing witnesses.

JAMES M. WORTH.

Witnesses:
K. E. HANNAH,
J. W. ANGELL.